UNITED STATES PATENT OFFICE.

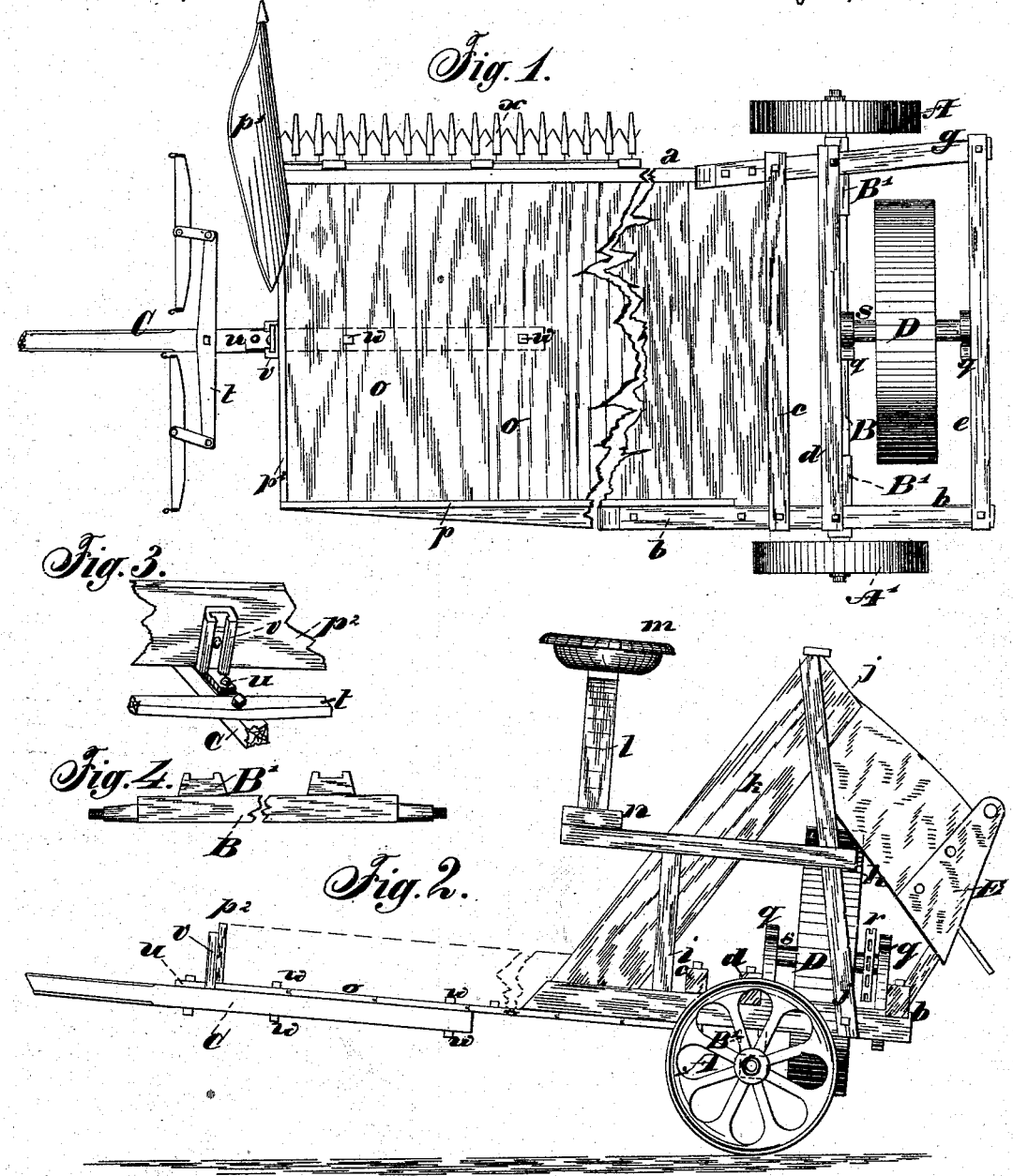

JOHN F. STEWARD, OF CHICAGO, ILLINOIS.

COMBINED HARVESTER AND TRUCK.

SPECIFICATION forming part of Letters Patent No. 276,642, dated May 1, 1883.

Application filed October 27, 1882. (No model.)

*To all whom it may concern:*

Be it known that I, JOHN F. STEWARD, of the city of Chicago, county of Cook, and State of Illinois, have invented a Combined Harvester and Transporting-Truck, of which the following is a full description, reference being had to the accompanying drawings, in which—

Figure 1 is a plan view; Fig. 2, a rear view, when speaking of the harvester as such, but a left-hand road-side view of the whole while in transit. Figs. 3 and 4 are details.

My invention consists in providing a harvester with means by which it may be converted into a truck for the purpose of transporting said harvester in the direction of its width, as hereinafter described, and particularly pointed out in the claims.

I secure the axle under the frame of the machine in such a position relative to the center of gravity that a slight preponderance of weight shall be thrown on the platform end, and thus, when the tongue is bolted to the latter, onto the horses in amount sufficient to make the whole controllable by the team, as is the case with any heavy two-wheeled truck.

In the drawings, A and A' are the truck-wheels, and B their axle.

C is the harvester-tongue, taken from its proper position when used as means of draft for the harvester, as such, with its butt-end between the sills $c$ and $d$ of the harvester-frame, as shown in dotted lines in Fig. 1.

D represents the supporting-wheel of the harvester.

E is the binder-frame.

I have shown only as much of the harvester and binder as is necessary to illustrate my invention, all of the working parts being omitted for the sake of clearness of those parts constituting my invention.

$a$ is the finger-bar of the harvester; $b$, the rearmost sill; $c$ and $d$, the usual gear-sills; $e$, the outside sill. $g$ is the front sill. $h$ is the seat-supporting girt. $i$, $j$, and $k$ are parts of the upper frame-work; $l$, the seat-spring; $m$, the seat; $n$, the seat-plank; $o$, the grain-platform; $p$, the back board; $p^2$, the divider-board; $p'$, the gathering-board of the divider. $q$ are segmental racks secured to the sills $d$ and $e$, in which the axle $s$ is vertically adjustable, by means of pinions, in the usual manner. $r$ is a disk secured to the axle $s$, and by which it is rotated to raise or lower the wheel D in its frame. $x$ is the cutting apparatus.

All of the parts so far pointed out, with the exception of the wheels A and A' and the axle B, do not differ from the ordinary harvester, and need no more description.

$t$ is the double-tree, occupying the same position on the tongue, whether the latter is in its place as means of draft for the harvester, as such, or its new position when the whole is used as a truck. $u$ is an angle-iron, of such dimensions as to thickness and width of its metal as to fit into the casting $v$ of the divider-board, which casting serves two purposes — namely, as means for securing the grain-wheel of the harvester in place, and also as means, in part, for securing the tongue to the platform, the bolts $w$ $w$, passing through the platform-boards and butt of tongue, serving as means of further security.

The trucks A A' may be of any suitable size and width of tread.

The axle B should be long enough to carry the wheels a little way outside of the frame of the harvester, and bolted to the sills in a position a little out of poise, as before described.

I show blocks B' upon the top of the axle, and notched to receive the sills $b$ and $g$. These are not a necessity, but by their use the harvester may be raised higher from the ground.

My device is prepared for use as follows: The grain-wheel is removed and the harvester-tongue transposed and secured to the platform, the angle-iron $u$ entering the casting $v$. The axle B is passed under the harvester and there secured. The wheels A A' are then placed upon the said axle. By suitable means the driving-wheel D is next raised from the ground, and the weight of the harvester is thus thrown on the trucks and the machine is ready for the road. The driver's seat is always in position, whether the machine is working or being transported. Unless the machine is cutting very low, it is not necessary to remove the axle B.

In some cases it may be desirable to elongate the sill $d$ and mount the wheels A A' directly thereon. Rather than to make the wheels larger, and thus incur expense, I use the supplemental bar B, and make it the axle, and by its use mount the machine high, even though on small wheels.

What I claim is—

1. A harvester having the platform o and sills a g and b p, in combination with the axle B, secured to said sills, and adapted to receive the removable truck-wheels A A', the detachable tongue C, and means by which it may be secured to the outer end of the platform, substantially as described.

2. A harvester constructed as described, and having a detachable grain-wheel at the outer side of the platform, the detachable tongue, means for securing said tongue to the outer end of the platform, and means for connecting it to the grain-wheel attachment, substantially as set forth.

JOHN F. STEWARD.

Witnesses:
JOHN B. KASPARI,
LAWRENCE A. BEALING.